Nov. 30, 1937.  C. R. POTTS  2,100,612
TRAILER
Filed April 11, 1936    2 Sheets-Sheet 1
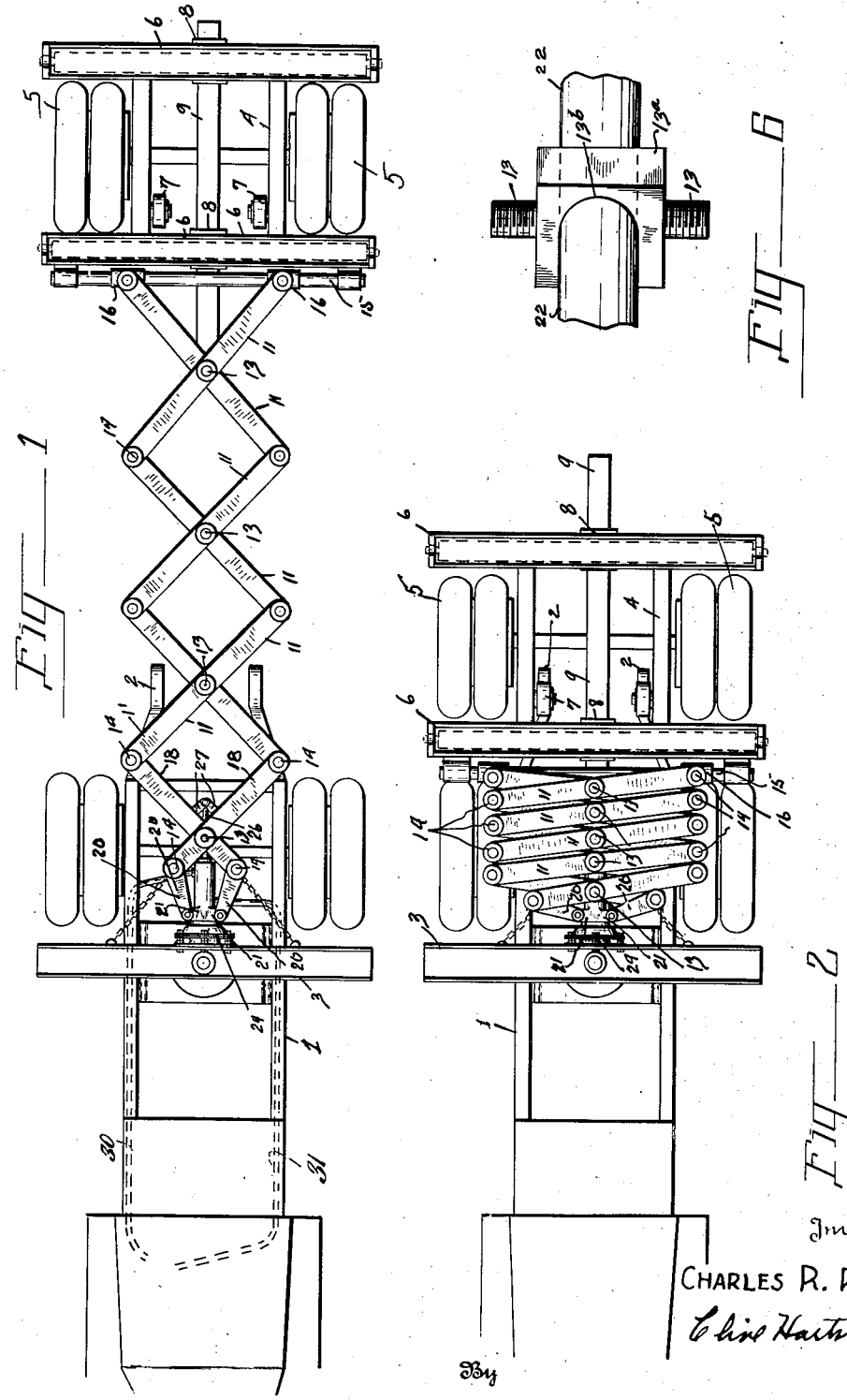

Nov. 30, 1937.  C. R. POTTS  2,100,612
TRAILER
Filed April 11, 1936   2 Sheets-Sheet 2
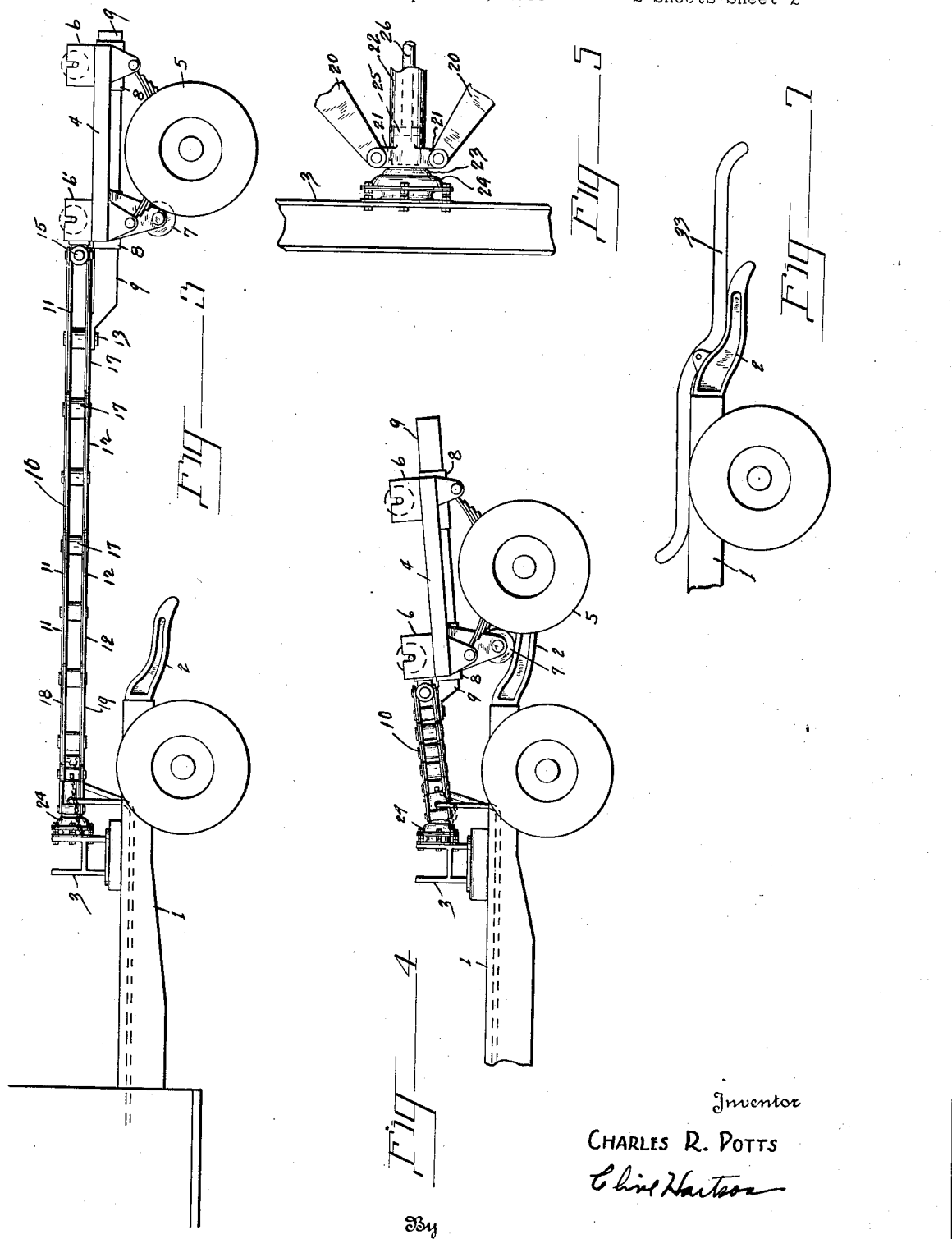
Inventor
CHARLES R. POTTS Patented Nov. 30, 1937

2,100,612

UNITED STATES PATENT OFFICE 2,100,612

TRAILER

Charles R. Potts, Klamath Falls, Oreg.

Application April 11, 1936, Serial No. 73,910

8 Claims. (Cl. 214—65)

My invention particularly relates to improvements in trailers employed in connection with trucks for hauling timbers and the like, and concerns itself particularly in providing a new and improved reach for attaching the trailer to the truck whereby the trailer when in unloaded condition can be carried upon the rear end of such truck. Constructionally my invention has to do with improvements in reaches for drawing trailers, such improvement being in the nature of a contractible and expansible reach, which when contracted allows the trailer to be carried by the truck which is drawing the trailer; and which when expanded positions such trailer in trailing position with regard to such truck, in which position it and the truck are able to carry loads of logs, timbers and the like.

My invention also relates to means for contracting and expanding the reach, which means are power operated and controllable from the cab of the truck, and readily and easily move the trailer to either trailing position, or to a position wherein it is carried by the truck.

In the drawing:

Figure 1 is a plan view of my invention with the trailer in trailing position and the reach in expanded condition.

Figure 2 is a plan view showing the reach in contracted condition and the trailer in a position wherein it is being carried by a truck.

Figure 3 is a side elevation showing the trailer in trailing position.

Figure 4 is a side elevation showing the reach contracted and the trailer in position wherein it is being carried by the truck.

Figure 5 is a fragmentary plan view showing a detail of the reach contracting and expanding means.

Figure 6 is a perspective of one of the pins entering into the construction of the reach.

Figure 7 is a fragmentary side elevation of a truck showing the trailer supporting means.

In the drawings similar characters refer to similar parts throughout the several views.

Referring to the drawings, the numeral 1 indicates a truck frame, provided at the rear with trailer supporting brackets 2. Swivelly mounted upon the truck is the load carrying bunk 3. The numeral 4 indicates a single axle trailer provided with ground wheels 5 and load bunks 6, also trunnions 7 which engage and travel upon brackets to enable the trailer to be carried by the truck. The trailer also has two reach seats 8 for the sliding stub reach 9. Mounted upon the forward end of the trailer and attached to the forward bunk is a slide or guideway 15 serving a purpose hereafter explained.

In conjunction with the trailer and truck there is a contractible and expandible reach 10 which is a form of lazy tongs and consists of the upper and lower links 11 and 12. These links are arranged in upper and lower pairs pivotally connected intermediate their ends by means of the pins 13. These double pairs of pivotally connected links are connected by their ends to ends of similarly connected double pairs of links by means of the pins 14. In this instance three double pairs of links employed, but this number may be increased or decreased if necessary. The free ends of the rearward double pair of links are pivotally connected to the top and bottom of the sleeves 16, which sleeves are slidably mounted upon the guideway or slide 15. In order to suitably space the upper and lower links from one another spacing sleeves 17 are employed on pins 14 and if not otherwise provided upon pins 13.

The free ends of the forward links 11 and 12 are connected to the double pair of links 18 and 19. The spacing between the pin 13 and the rearward ends of links 18 and 19 is the same as the distance between the pins 14 and 13 on the other links. On the other hand the distance to the free ends of the links 18 and 19 from the pin 13 is considerably shorter, and to these free ends are connected by means of pin 14 the rearward ends of the stub links 20, and the forward ends of the latter links are pivotally connected to the ears 21. These ears project from the power cylinder 22 which has a ball 23 on its forward end which ball is seated in the socket 24 which in turn is mounted to the rearward side of bunk 3. Cylinder 22 has a piston 25 and piston rod 26. The rearward end of the piston rod is pivotally connected to the actuating links 27 which in turn are pivotally connected to the longer portions of the links 18 and 19. The front end of the stub reach 9 is pivotally connected to the rearmost bolt 13.

Certain of the pins 13 are provided with an intermediate body portion 13a positioned between upper and lower links of the reach. This body portion serves to maintain the upper and lower links in proper spaced relationship. The body portion 13a has an opening therethrough 13b sufficiently large to permit the body portion to pass over the end of the cylinder 22.

Numerals 30 and 31 refer to hydraulic feed conductors which are connected to a hydraulic apparatus, not shown, for actuating the piston 25 and piston rod 26. When the piston moves to the forward end of the cylinder, the connections between the piston rod and the links 18 and 19 cause the truss like member composing the reach 10 to contract longitudinally and expand transversely. This longitudinal contraction is brought about by the pivotal movement of the several links composing the reach, the links changing from a position which is more or less longitudinal relative to the axis of the reach to a position where they tend to be transverse to such axis.
When the piston moves to the rearward end of the cylinder the action is reversed and the reach expands longitudinally, the several links being positioned at a lesser angle to the axis of the reach. During the expanding movement and contracting movement of the reach the stub reach slides back and forth in its slides 8 in the trailer. This stub reach acts as a brace for the rearward end of the reach, and serves to maintain alignment between it and the trailer, and to maintain the axis of the reach in alignment with the axis of the trailer. Figures 1 and 3 show the reach in expanded condition with the trailer in trailing position, while Figures 2 and 4 show the reach in contracted condition wherein the trailer is being supported and carried upon the support brackets 2. The trailer can be moved from trailing position to carried position or vice versa at any time, when it is not carrying a load, regardless of whether truck and trailer are in motion or are stationary.

In the operation of contracting the reach, the forwardmost pin 13 passes ahead of the rear end of the cylinder 22. To do so it is constructed as shown in Figure 6 permitting the opening 13b in such pin to pass around the end of such cylinder.

In the event that dual axle trailers are employed, a detachable extension bracket 33 may be employed. This is sufficiently long to support the auxiliary axle of such trailer.

While a specific form of the improvement has been described and illustrated herein, it is desired to be understood that the same may be varied, within the scope of the appended claims, without departing from the spirit of the invention.

Having described my invention, I claim—

1. In combination with a truck and a trailer, a pivotal mounting upon the truck, a transverse slide upon the trailer, a reach comprising a plurality of pivotally connected links forming a lazy tongs, a slidable connection between the rear end of the reach and the aforesaid slide, a stub reach slidably carried by the trailer having one end pivotally connected to a pivotal connection between the links at one end of the reach, and power means to which is connected the opposite end of the reach operable to contract and expand such reach.

2. In combination with a truck and a trailer, a pivotal mounting upon the truck, a transverse slide thereon, a reach comprising a plurality of pivotally connected links forming a lazy tongs, a slidable connection between the rear end of the reach and the aforesaid slide, a stub reach slidably carried by the trailer having one end pivotally connected to a pivotal connection between the links at the rear end of the reach, and hydraulic means including a cylinder, a piston and a piston rod to which the forward end of the reach is connected operable to contract and expand such reach.

3. In combination with a truck and a trailer, a pivotal member mounted to the track, a slide upon the trailer, plurality of links arranged in pairs having their intermediate portions pivotally connected and the ends of one pair pivotally connected to the ends of another pair to provide a contractible and expansible reach in the form of a lazy tongs, a slidable connection between the rear end of the reach and the aforesaid slide, a stub reach slidably carried by the trailer having one end pivotally connected to a pivotal connection between the links at the rear end of the reach, and power means connected to the links at the forward end of the reach operable to contract and expand such reach.

4. In combination with a truck and a trailer, a pivotal member mounted upon the truck, a reach comprising a plurality of pivotally connected links forming a lazy tongs, said reach having its ends slidable and pivotally connected respectively to the trailer and the pivotal member, and means mounted to the pivotal member and connected with certain links operable to contract and expand such reach.

5. In combination with a truck and a trailer, a pivotal member mounted upon the truck, a plurality of pivotally connected links forming a lazy tongs constituting a contractible and expansible reach, said reach having its ends slidably connected to the trailer and pivotally connected with the pivotal member, and means mounted upon the pivotal member and connected to certain links operable to contract and expand such reach.

6. In combination with a truck and a trailer, a plurality of pivotally connected links forming a lazy tongs constituting a contractible and expansible reach, said reach having its ends slidably connected respectively to trailer and truck, and means including a cylinder, a piston operable therein and a piston rod connected between piston and certain links operable to contract and expand such reach.

7. In combination with a truck and a trailer, pivotally connected links forming a lazy tongs constituting a contractible and expansible reach, said reach having its ends slidably and pivotally connected respectively to trailer and truck, and power operated means connected to forward end of the reach operable to contract and expand such reach.

8. In combination with a truck and a trailer, links forming lazy tongs constituting a contractible and expansible reach the ends of which are slidably connected to the trailer and pivotally connected to the truck and means operable to contract and expand such reach.

CHARLES R. POTTS.